(12) United States Patent
Miller et al.

(10) Patent No.: US 10,361,416 B2
(45) Date of Patent: *Jul. 23, 2019

(54) BATTERY SEPARATOR FOR EXTENDING THE CYCLE LIFE OF A BATTERY

(71) Applicant: Daramic LLC, Charlotte, NC (US)

(72) Inventors: Eric Henri Miller, Philpot, KY (US); John Randolph Timmons, Owensboro, KY (US); John Kevin Whear, Utica, KY (US)

(73) Assignee: Daramic, LLC, Charlotte, NC (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/389,938

(22) Filed: Dec. 23, 2016

(65) Prior Publication Data

US 2017/0110702 A1   Apr. 20, 2017

Related U.S. Application Data

(63) Continuation of application No. 11/535,701, filed on Sep. 27, 2006, now Pat. No. 9,564,623.

(51) Int. Cl.
| | |
|---|---|
| *H01M 2/14* | (2006.01) |
| *H01M 2/16* | (2006.01) |
| *H01M 2/18* | (2006.01) |
| *H01M 10/12* | (2006.01) |
| *B32B 3/30* | (2006.01) |
| *B32B 7/12* | (2006.01) |

(52) U.S. Cl.
CPC ............. *H01M 2/1686* (2013.01); *B32B 3/30* (2013.01); *B32B 7/12* (2013.01); *H01M 2/145* (2013.01); *H01M 2/16* (2013.01); *H01M 2/18* (2013.01); *H01M 10/12* (2013.01); *B32B 2250/02* (2013.01); *B32B 2307/202* (2013.01); *B32B 2307/206* (2013.01); *B32B 2457/10* (2013.01); *Y02E 60/126* (2013.01)

(58) Field of Classification Search
CPC ........ H01M 2/16; H01M 2/1686; H01M 2/18; H01M 2/14; H01M 2/145; H01M 4/64; H01M 4/66665; H01M 4/667; H01M 10/12; H01M 10/06; Y02E 60/126; B32B 3/30; B32B 7/12

See application file for complete search history.

(56) References Cited

U.S. PATENT DOCUMENTS

| | | | | |
|---|---|---|---|---|
| 3,877,985 | A * | 4/1975 | Rampel | H01M 4/246 |
| | | | | 429/222 |
| 4,009,056 | A * | 2/1977 | Megahed | H01M 4/06 |
| | | | | 429/126 |
| 4,245,013 | A * | 1/1981 | Clegg | D21H 5/20 |
| | | | | 429/144 |
| 9,564,623 | B2 * | 2/2017 | Miller | H01M 2/16 |
| 2006/0141350 | A1 * | 6/2006 | Dreyer | H01M 2/14 |
| | | | | 429/143 |

FOREIGN PATENT DOCUMENTS

| | | | | |
|---|---|---|---|---|
| JP | 53-26929 | * | 3/1978 | ............. H01M 4/06 |
| WO | WO 2004/112166 | * | 12/2004 | |

* cited by examiner

*Primary Examiner* — Raymond Alejandro
(74) *Attorney, Agent, or Firm* — Hammer & Associates, P.C.

(57) ABSTRACT

A battery separator for extending the cycle life of a battery has a separator and a conductive layer. The conductive layer is disposed upon the separator. The conductive layer is adapted to be in contact with the positive electrode of the battery thereby providing a new route of current to and from the positive electrode.

15 Claims, 3 Drawing Sheets

US 10,361,416 B2

BATTERY SEPARATOR FOR EXTENDING THE CYCLE LIFE OF A BATTERY

RELATED APPLICATION

This application is a continuation of U.S. application Ser. No. 11/535,701, filed on Sep. 27, 2006, now U.S. Pat. No. 9,564,623.

FIELD OF INVENTION

The instant application relates to battery separators used in secondary batteries.

BACKGROUND OF THE INVENTION

A battery separator is a component that divides, or "separates", the positive electrode from the negative electrode within a battery cell. A battery separator has two primary functions. First, a battery separator must keep the positive electrode physically apart from the negative electrode in order to prevent any electronic current passing between the two electrodes. Second, a battery separator must permit an ionic current between the positive and negative electrodes with the least possible resistance. A battery separator can be made out of many different materials, but these two opposing functions have been best met by a battery separator being made of a porous nonconductor.

An important parameter for describing a battery is the achievable number of cycles, or the cycle life of the battery. The cycle life indicates how often a battery can be charged and discharged repeatedly before a lower limit of the capacity is reached, or a failure. Batteries with a cycle life include all secondary batteries, or batteries that are capable of being recharged several times. There are many secondary batteries, including, but not limited to, lead-acid batteries. For economical and ecological, reasons, batteries with a high cycle life are preferred.

Many batteries have a low cycle life, or fail, due to deterioration of the positive electrode conductor. The positive electrode conductor, usually in the form of a grid in a lead-acid battery, deteriorates from corrosion during the electrochemical process. The positive electrode conductor corrodes faster than the negative electrode conductor because of the greater effects of the electrochemical process on the positive electrode. The more current flowing through the positive electrode conductor, the faster the positive electrode conductor deteriorates. The positive electrode conductor is a critical element of a battery as it provides the means for electrical current to flow to and from the positive electrode. Thus, when the positive electrode conductor deteriorates, electrical current to and from the battery deteriorates. This deterioration causes the battery power to deteriorate, which in turn leads to battery failure.

Therefore, there is a need for extending the cycle life of a battery. More specifically, there is a need for extending the life of the positive electrode conductor to achieve extended cycle life of the battery.

SUMMARY OF THE INVENTION

The instant invention battery separator for extending the cycle life of a battery. The battery separator has a separator and a conductive layer. The conductive layer disposed upon the separator. The conductive layer is adapted to be in contact with the positive electrode of the battery thereby providing a new route of current to and from the positive electrode.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
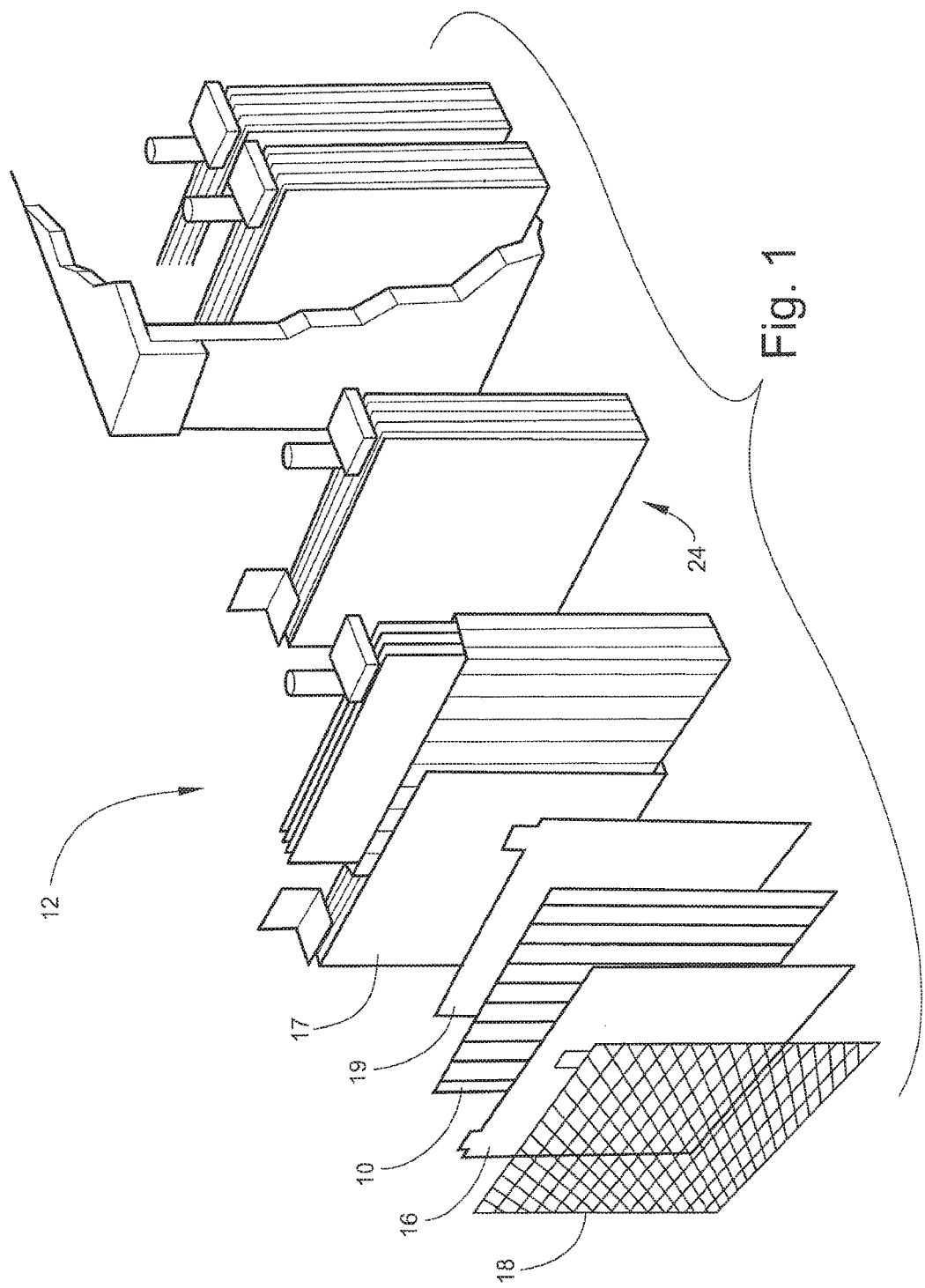
FIG. 1 is a fragmentary cross-sectional view of a battery with one embodiment of the battery separator of the present invention.

Referring to the drawings, wherein like numerals indicate like elements, there is shown in FIG. 1 an embodiment of a battery separator 10 for extending the cycle life of a battery 12. Battery 12 may be any type of battery. More specifically, battery 12 may be any type of battery that may be susceptible to electrode conductor deterioration. Battery 12 may be a secondary battery. For example, battery 12 may be a lead-acid battery (as shown in FIG. 1.)

At least one battery separator 10 may be included in battery 12 (see FIG. 1). Preferably, one battery separator 10 may be included in each cell 24 of battery 12. Battery separator 10 may be for preventing any electronic current from passing between a positive electrode 16 and a negative electrode 17 while allowing ionic current to flow between positive electrode 16 and negative electrode 17. In addition, battery separator 10 may be for extending the cycle life of battery 12 by providing a new route of current to and from positive electrode 16. Battery separator 10 may also extend the cycle life of battery 12 by functioning as a positive electrode conductor when the conductive capability of positive electrode conductor 12 deteriorates. Battery separator 10 may be made of any known battery separator materials, including, but not limited to, any porous nonconductor. Battery separator 10 may be any size or shape, including, but not limited to, flat or having ribs 22. Preferably, battery separator 10 may have ribs (see FIG. 2). Battery separator 10 may include a conductive layer 14.

Figure 2:
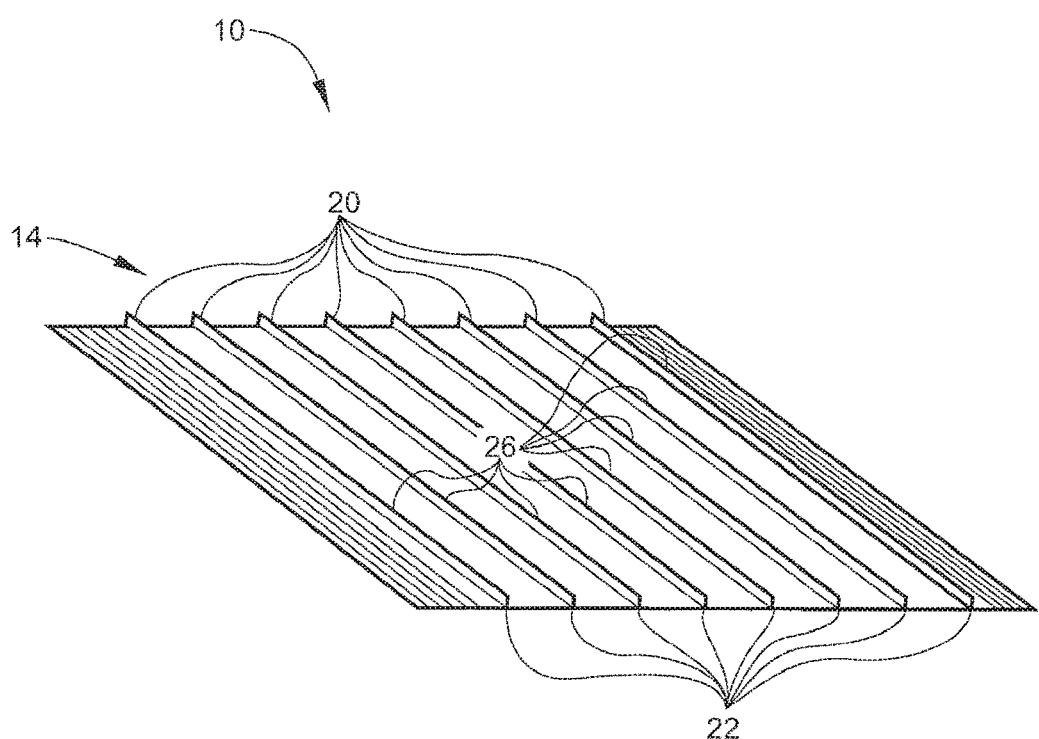
FIG. 2 is an isometric view of one embodiment of the battery separator of the present invention.

Conductive layer 14 may be disposed on battery separator 12 FIG. 2). Conductive layer 14 may be adapted to be in contact with positive electrode 16 of battery 12 (see FIG. 1). Conductive layer 14 may be for providing a new route of current to and from positive electrode 16. Conductive layer 14 may be made of any conductive material, including, but not limited to, lead, gold, antimony, arsenic, zinc, barium, beryllium, lithium, magnesium, nickel, aluminum, silver, tin, and combination alloys thereof, or carbon fibers, graphite, carbon nanotubes, or buckyballs. The carbon nanotubes or buckyballs might be dispersed in a medium with a binder and painted on battery separator 10. Conductive layer 14 may be made of any conductive material that is more corrosion resistant than positive electrode conductor 18, thus, allowing conductive layer 14 to function as the positive electrode conductor 18 when the conductive capability of the positive electrode conductor 18 deteriorates. Conductive layer 14 may be a lead based alloy with 0.8% to 1.17% tin, and greater than zero (0) to 0.015% silver. Conductive 14 may be a lead-based alloy with 0.02% to 0.06% calcium, 0.3% to 3% tin, and 0.01% to 0.05% silver. Conductive layer 14 may be made into any form, including but not limited to, a strip, a screen, a foil, a thread, a wire, a coating, etc. Conductive layer 14 may be any thickness, including, but not limited to, a thickness of three (3) micro meters. Conductive layer 14 may be disposed upon battery separator 10 by any means, including, but limited to, adhesives, hot melting, painting, etc.

Ribs 22 may be included on battery separator 10. Ribs 22 may be for maintaining a maximum distance between the positive electrode. 16 and the battery separator 10. Ribs 22 may also be for achieving the desired electrolyte distribution in battery 12. Ribs 22 may be of any shape (straight, angled, waves, etc.) or form (triangular, circular, square, etc.). Ribs 22 may include tips 26.

Tips 26 may be a component of ribs 22. Tips 26 may be the distal ends of each rib 22. Tips 22 may be for providing a location for conductive layer 14 to be disposed on battery separator 10 that allows conductive layer 14 to be in contact with positive electrode conductor 16. More specifically, tips 22 may be for providing a specific location for conductive layer 14 to be in contact with positive electrode conductor 16, which allows conductive layer 14 to be made out of the least amount of material for economical purposes.

For example, as shown in FIGS. 1-2, battery separator 10 may be made of a porous nonconductor and have ribs 22 with tips 26. Conductive layer 14 may be made of a fine silver powder dispersed in a solvent and painted onto the tips 26 of ribs 22. Battery separator 10 may be used as the separator of each cell 24 of battery 12.

In operation, battery separator 10 may perform the functions of a battery separator. Meaning, battery separator 10 may keep the positive electrode 16 physically apart from the negative electrode 17 in order to prevent any electronic current from passing between the two electrodes, and battery separator 10 may allow ionic current to flow between the positive electrode 16 and the negative electrode 17. These functions may allow the electrochemical process to take place and may force the electrical current to flow from positive electrode conductor 18 to negative electrode conductor 19, thus, allowing battery 12 to provide energy.

Battery separator 10 may also provide extended cycle life for battery 12. Extended cycle life may be accomplished through conductive layer 14. Conductive layer 14 may provide two ways of extending the cycle life for battery 12.

First, because conductive layer 14 may be adapted to contact the positive electrode 16 of battery 12 and conductive layer 14 may be made out of a conductive material, conductive layer 14 may act as a second positive electrode conductor. This means that conductive layer 14 may provide a new route of current to and from positive electrode 16. This new route of current through conductive layer 14 may reduce the amount of current through positive electrode conductor 18. Accordingly, the rate that positive electrode conductor 18 deteriorates may be reduced. Thus, conductive layer 14 may extend the cycle life of battery 12.

Second, because conductive layer 14 may be adapted to be in contact with positive electrode 16 providing a new route of current to and from positive electrode 16, and because conductive layer 14 may be more corrosive resistant than positive electrode conductor 18, conductive layer 14 may function as positive electrode conductor 18 when the conductive capability of positive electrode conductor 18 deteriorates. This means that when a control battery fails due to the positive electrode conductor deteriorating, battery 12 with battery separator 10 may not fail because conductive layer 14 may function as positive electrode conductor 18.

Thus, battery separator 10, and more specifically, conductive layer 14 on battery separator 10, may provide two ways of extending the cycle life of battery 12.

Test 1

One three-plate cell was constructed using various alternatives to make the ends of the ribs conductive. The following are descriptions of the various ideas used:

Cell A used strips of thin pure lead attached to the tips of the ribs with adhesive.

Cell B used aluminum foil attached to the tips of several outer ribs using hot melt.

Cells C1 and C2 used Aluminum foil that was attached to the tips of the ribs with hot melt, with a punctured solid layer of foil in the center of the separator. Two different ideas for evaluating the foils performance were used, one being with large "windows" and the other with small slits in the foil layer, thus, allowing electrolyte to flow freely.

Cell D was the control material for the test.

Cell E used Silver paint (fine silver powder dispersed in a solvent, used for coating SEM samples) that was painted onto the tips of the ribs of the separator. Roughly 1 g of silver powder was applied to the separator, in a layer of approximately twenty (20) micro meters.

These cells were formed and subjected to the following cycling regime: Discharged at 10 A to 1.65V; Charged at 2.50V (10 A limit) to 120% Ah removed; Discharged at 5 A to 1.65V; Charged at 2.50V (10 A limit) to 120% Ah removed; Discharged at 1 A to 1.65V; Charged at 2.50V (10 A limit) to 120% Ah removed; and Charged at 1 A for 100 hours. This cycle was repeated until the capacity fell below 50% of initial capacity.

Figure 3:
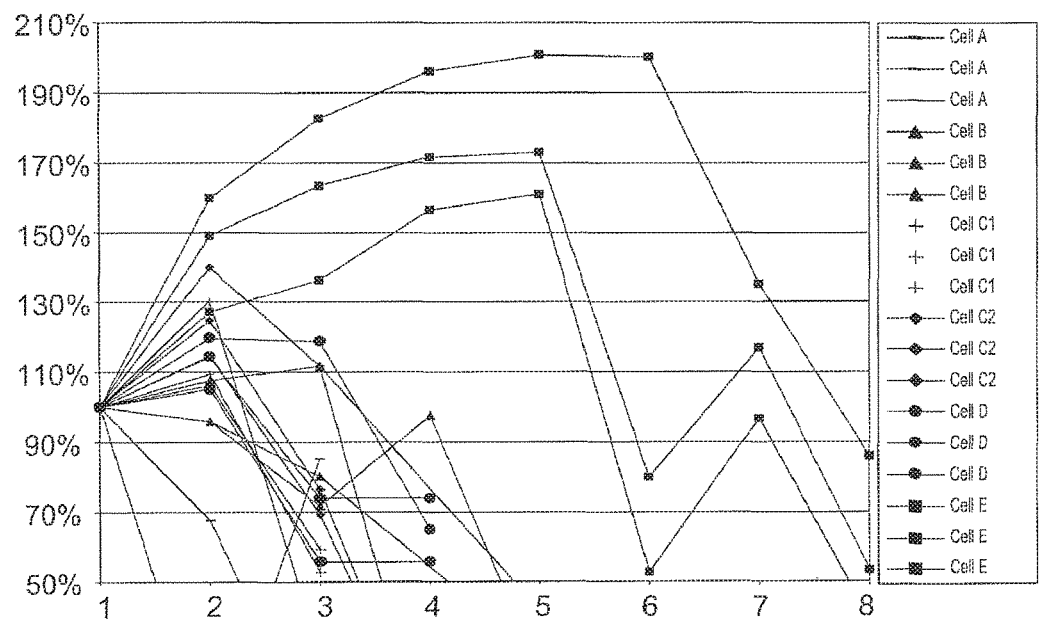
FIG. 3 is a line graph of the results of test 1.

A chart showing the results of the first test is shown in FIG. 3. In FIG. 3 the y-axis represents the Percentage of Cycle 1 Capacity, and the x-axis represents the Cycle Number.

As shown from the result of test 1, a battery separator with a conductive layer added to it may extend the cycle life of a battery. The cell with the silver paint added to the separator lasted twice as long as the other alternatives, including the control.

Test 2

Figure 4:
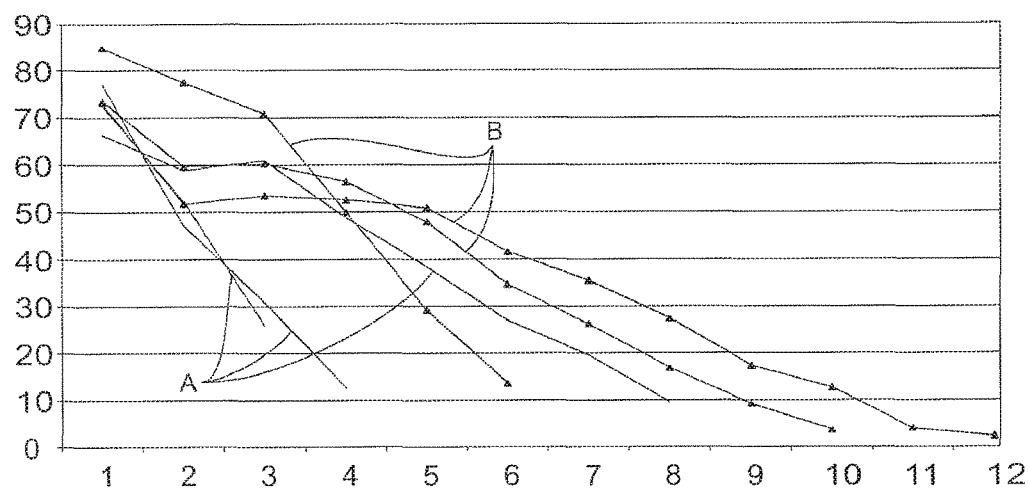
FIG. 4 is a line graph of the results of test 2.

As a result of the work conducted and results achieved, in test 1, a second test was set up to verify the results of the first test see FIG. 4), For this test, a total of six Complete batteries were built; three as controls and three with battery separators with silver on the tips of the ribs. These batteries were subsequently tested via the high temperature (75° C.) SAF J-240 life test, with the following modification made: As the batteries were made in-house and did not have standard ratings or intercell connectors, the reserve capacity was measured instead of a discharge at the CCA rate.

A chart detailing the results of the second test is shown in FIG. 4. In FIG. 4, the y-axis represents the Capacity in minutes and the x-axis represents the Week Number. The control batteries are represented by reference letter A, and the Test batteries are represented by reference letter B.

As a result of test 2, the batteries with the silver painted on the ribs were confirmed to last longer than the control batteries.

Upon reviewing the results of the two battery tests conducted, battery separator 10 shows results for extending the cycle life of a battery. Additionally, capacity of a battery with a battery separator according to the instant invention may be higher than control batteries.

The present invention, may be embodied in other forms without departing from the spirit and the essential attributes thereof, and, accordingly, reference should be made to the appended claims, rather than to the foregoing specification, as indicated in the scope of the invention.

We claim:

1. A battery separator in a lead acid secondary battery having a positive electrode therein, the battery separator comprising:
   a porous nonconductive membrane;
   wherein said porous nonconductive membrane further comprises ribs; and
   a conductive layer comprising silver painted onto a tip of said ribs,
   said conductive layer in direct contact with the positive electrode of the lead acid secondary battery, wherein the positive electrode is made from a material less corrosion resistant than the conductive layer.

2. The separator according to claim 1, wherein the conductive layer further comprises lead.

3. The separator according to claim 1, wherein the conductive layer further comprises lead and tin.

4. The separator according to claim 1, wherein the conductive layer further comprises lead, calcium and tin.

5. The separator according to claim 2, wherein the conductive layer comprises a lead alloy comprising silver in an amount from greater than 0 to 0.015%.

6. The separator according to claim 3, wherein the conductive layer comprises a lead alloy comprising 0.8%-1.17% tin and silver in an amount from greater than 0 to 0.015%.

7. The separator according to claim 4, wherein the conductive layer comprises a lead alloy comprising 0.02%-0.06% calcium, 0.3%-3% tin, and 0.01%-0.05% silver.

8. The battery separator of claim 1 where said conductive layer is in the form of strips, screen, foil, thread, wire, or coating.

9. The battery separator of claim 1 where said conductive layer is disposed upon said separator by adhesively bonding said conductive layer on said separator.

10. The battery separator of claim 1 where said conductive layer is disposed upon said separator by hot melting said conductive layer on said separator.

11. The battery separator of claim 1 wherein said conductive layer is adhered to said porous nonconductive membrane by coating said conductive layer on said porous nonconductive membrane.

12. The battery separator of claim 1 comprising ribs adapted to face the positive electrode.

13. A lead acid battery comprising the battery separator of claim 1.

14. A lead acid battery comprising the battery separator of claim 11.

15. A lead acid battery comprising the battery separator of claim 12.

* * * * *